United States Patent [19]

Grunberg

[11] Patent Number: 4,651,855

[45] Date of Patent: Mar. 24, 1987

[54] AUTOMATIC CLUTCH CONTROL DEVICE

[75] Inventor: Pierre Grunberg, Paris, France

[73] Assignee: Valeo, Paris, France

[21] Appl. No.: 667,482

[22] PCT Filed: Feb. 2, 1984

[86] PCT No.: PCT/FR84/00023

§ 371 Date: Oct. 2, 1984

§ 102(e) Date: Oct. 2, 1984

[87] PCT Pub. No.: WO84/03071

PCT Pub. Date: Aug. 16, 1984

[30] Foreign Application Priority Data

Feb. 4, 1983 [FR] France ................................ 83 01748

[51] Int. Cl.⁴ ........................ B60K 41/02; F16D 43/24
[52] U.S. Cl. ............................... 192/0.032; 192/0.076;
192/0.096; 192/90; 192/103 C
[58] Field of Search ............... 192/0.032, 0.033, 0.076,
192/0.096, 90, 103 R, 103 C

[56] References Cited

U.S. PATENT DOCUMENTS

| | | | |
|---|---|---|---|
| 3,402,793 | 9/1968 | Scholl | 192/0.033 |
| 4,081,065 | 3/1978 | Smyth et al. | 192/0.076 |
| 4,497,397 | 2/1985 | Windsor et al. | 192/0.076 |
| 4,509,625 | 4/1985 | Tellert | 192/0.033 |
| 4,561,530 | 12/1985 | Parsons et al. | 192/0.076 |

FOREIGN PATENT DOCUMENTS

| | | |
|---|---|---|
| 2700821 | 7/1978 | Fed. Rep. of Germany . |
| 2487462 | 1/1982 | France . |
| 990115 | 4/1965 | United Kingdom . |
| 1137982 | 12/1968 | United Kingdom . |
| 2012892 | 8/1979 | United Kingdom . |
| 2079888 | 1/1982 | United Kingdom ............. 192/0.032 |
| 2080910 | 2/1982 | United Kingdom . |

Primary Examiner—Rodney H. Bonck
Assistant Examiner—Richard M. Lorence
Attorney, Agent, or Firm—Young & Thompson

[57] ABSTRACT

The control device comprises an electric motor-gearbox unit (2) acting on the thrust bearing (16) of a clutch (1) and a switching device (3) comprising four transistors adapted to apply the voltage from the battery (30) with either polarity to the motor (20) of the motor-gearbox unit (2) according to whether the output of "AND" gates (41 and 42) is at 1. This occurs, when end of travel switches (28 and 29) are closed, when positive pulses appear at the output (40c) of the microprocessor (40) and according to whether the output (40d) is at "0" or "1". The microprocessor produces pulses of defined duration at its output (40c) with a recurrence frequency which is a direct function of the frequency produced by the sensor (50) responsive to the rotation speed of the motor when above a threshold higher than the idling speed, in the clutch engagement phase, and which is such in the clutch release phase that the pulses are adjacent. The clutch engagement and release phases are defined by the state of the input (40b) of the microprocessor, a logic system (51) coupled to control devices of the vehicle being adapted to produce a clutch release order.

4 Claims, 2 Drawing Figures

AUTOMATIC CLUTCH CONTROL DEVICE

The invention relates to an automatic control device for the clutch of a motor vehicle, comprising at least one proportional sensor responsive to the rotation speed of the motor and a logic system coupled to control devices of the vehicle and adapted to produce a two-state signal of which one, so-called active state corresponds to a clutch release order, means for operating the clutch between a first, engaged and a second, disengaged position, and means (3, 40) controlling the operating means responsive to the proportional sensor signals and to the two-state signal so that the clutch is disengaged to its second position in response to the active state of the two-state signal and, in the absence of such active state, the clutch is moved towards the first position in accordance with a selected function of the motor speed when above a threshold.

The reader is reminded that a clutch is fitted to a motor vehicle essentially because internal combustion engine type motors (in the broad sense) produce sufficient driving torque or feature adequate efficiency only over a restricted range of rotation speeds, significantly lower than the range of speeds appropriate to the driving axle; in particular, the speed of the vehicle must necessarily start from zero, in absolute value, whereas the motor is incapable of continuing to rotate off-load below a certain rotation speed. In practice the minimum motor speed, often referred to as the idling speed, is taken to be a speed substantially higher than the lower limit rotation speed in order to provide a safety margin, being determined so that the motor runs in a regular manner and is capable of responding without delay to acceleration, whilst also ensuring satisfactory operation of ancillary devices, in particular a generator and cooling system.

The range of rotation speeds of the driving axle is extended, on the one hand, by the use of a gearbox with a number of ratios. Changing gear and starting the vehicle requires that the component parts of the clutch, namely the driving member consisting of the motor flywheel and the driven member consisting of the friction disk assembly coupled to the gearbox input shaft, rotating at different speeds at the start of the clutch engagement phase, become progressively locked together, the speed differential being cancelled out. This phase in which the speed differential is cancelled out corresponds to a slipping of the friction members of the clutch.

Using the conventional driving technique, after disengaging the clutch and selecting a gearbox ratio, the driver causes the motor to accelerate whilst progressively engaging the clutch, this progressive action resulting in an approximately constant speed.

To achieve automatic control of the clutch there have been produced so-called "centrifugal" clutches in which the clamping of a friction surface between driving and driven members is brought about by the movement away from one another of flyweights attached to the driving member. In this case the clutch clamping force increases with the rotation speed of the motor.

This arrangement has a number of disadvantages: the braking effect of the motor is negligible at low speeds; the range of rotation speeds which brings about the change from the initiation of clutch engagement to positive engagement is fixed, at least for a given state of wear of the friction surfaces; consequently, this range of rotation speeds of the motor cannot be used under normal conditions and the clutch cannot be operated above this range. Furthermore, the fixed relationship between the motor speed and the clutch clamping force does not provide for any adaptation to suit specific clutch engagement conditions; in particular, it is not possible to use the full motor torque when starting on a hill and under load.

French patent application No. 2 487 462 filed July 24, 1981 under the No. 81 14797 describes an automatic control device for a friction clutch in which the position of the control member may be adjusted in the slipping area, situated between a position at which the transmission of the rotational torque begins and the clutch engagement position, by means of a programmable controller which is responsive to the rotation speed of the motor according to a defined characteristic. The characteristic function may be selected according to the motor operating parameters. Also, a logic system with sensors installed on control members such as the gearbox, accelerator and brakes determines if the motor should be decoupled by the clutch (to change gear, for example) or if the clutch control device should be operated.

It will be understood that the arrangement described in this patent application overcomes a number of the disadvantages of centrifugal clutches, in particular the extent of the range of speeds corresponding to the slipping area and the impossibility of adapting the position of this range to suit the motor operating parameters. As a secondary aspect, there is provision for compensating the wear of the friction surfaces by recording the clutch engagement position origin each time the motor is started.

Even so, the device described does not adapt the operation of the clutch to suit the actual torque which the motor can supply. The function can of course be determined so as to take into account the position of the accelerator, but there is not a one-to-one relationship between the accelerator position and the available motor torque and the actual relationship depends on the type of motor, how it is adjusted and the speed at which it is rotating.

The applicant's researches have gone back to first principles, in particular by analysing the behaviour of drivers when operating the clutch; this analysis has shown, in a first phase, that to engage the clutch the typical driver operates the accelerator so as to set the motor speed to a value at which it can provide useful torque, involving an acceleration in the rotation speed; when the selected rotation speed is obtained, the driver progressively engages the clutch, this action resulting in an approximate stabilisation of the rotation speed; when the clutch is completely engaged, the rotation speed is then adapted to the required speed of movement of the vehicle.

Further refining this analysis of the behaviour of the typical driver, the applicant has observed that during the clutch engagement phase the typical driver operates the accelerator and clutch simultaneously in such a way that the rotation speed of the motor, instead of being stabilised, goes to a maximum at the beginning of clutch engagement and is then slightly reduced until a point at which the gearbox input shaft is locked to the motor flywheel. For a given speed at the end of clutch engagement, this method permits the torque to be taken up in a manner which is more favourable to the service life of the clutch than engagement at constant motor speed.

In line with the conclusions of the applicant's researches, the invention proposes an automatic control device for the clutch of a motor vehicle, comprising at least one proportional sensor responsive to the rotation speed of the motor and a logic system coupled to control devices of the vehicle and adapted to produce a two-state signal of which one, so-called active state corresponds to a clutch release order, means for operating the clutch between a first, engaged and a second, disengaged position, and means (3, 40) controlling the operating means responsive to the proportional sensor signals and to the two-state signal so that the clutch is disengaged to its second position in response to the active state of the two-state signal and, in the absence of such active state, the clutch is moved towards the first position in accordance with a selected function of the motor speed when above a threshold, device characterized in that the operating means are connected to a direct current voltage source through an on/off switching device with two channels corresponding to operation between the first and second positions, respectively, and in that the control means comprise a logic processor adapted to enable one channel of the switching device for periods of specified duration, the frequency at which such periods recur being a selected function of the speed sensor signal, and the enabled channel being the first or the second according to whether the drift with time in respect of the motor speed is respectively algebraically higher or lower than a selected threshold acceleration.

With the arrangement thus defined, and as in the prior art, the control device commands release of the clutch in response to the active state of the signal produced by the system of logic sensors and engagement of the clutch when the signal produced by the logic system is no longer in the active state, the clutch being commanded so as to move towards the engaged position in accordance with a selected function of the rotation speed when above a threshold; furthermore, in a manner specific to the invention, displacements of the manoeuvering means are effected in increments corresponding to the production of pulses which are calibrated in terms of amplitude and duration, the recurrence frequency determining the displacement speed of the operating means. It will have been understood that in order to reproduce the behaviour of the typical driver the threshold acceleration normally has a negative value; in other words, this threshold acceleration in fact corresponds to deceleration of the motor; the direction of displacement of the operating means is such that an acceleration with a value which is algebraically higher than the threshold acceleration (this acceleration possibly being a deceleration with absolute value lower than the threshold deceleration) corresponds to clamping up of the clutch, whereas an acceleration with a value which is algebraically lower than the threshold acceleration (or more generally a deceleration with an absolute value higher than the threshold deceleration) corresponds to release of the clutch. Thus clamping up of the clutch is conditioned by selected motor speed laws.

The threshold acceleration is preferably conditioned by the rotation speed of the motor; it will be understood that the deceleration at the end of clutch engagement must depend on the motor speed.

Furthermore, the function relating the recurrence frequency to the speed sensor signal is preferably selected from a plurality of increasing monotonic functions, according to parameters sensed from the control members coupled to the logic system. It will be understood that the clutch engagement speed may thus be adapted to suit driving parameters, in particular the gearbox ratio. It will be noted that the operation of the device is conditioned by direct criteria which are, to a first approximation, independent of the characteristics of the vehicle and its motor, differing in this from the prior art devices.

The logic processor is preferably adapted to enable the second channel of the switching device in response to the active state of the two-state signal, the recurrence frequency of the periods of defined duration then being such that these periods are adjacent. In other words, the operating means are continuously live during their clutch release travel, which is executed at maximum speed and thus in minimum time.

In a preferred arrangement, a proportional speed sensor is coupled to the driven shaft of the clutch and the logic procesor is adapted to adjust the recurrence frequency of the periods of defined duration and to select a channel of the switching device accordingly, by means of a selected algorithm applied to the signals produced by the two rotation speed sensors. In this way it is possible, in particular, to modulate the recurrence frequency according to the speed differential of the driving and driven members of the clutch, to take account of the fact that this speed differential is indicative of the driving torque which is beginning to be generated by virtue of the clamping up of the clutch.

The characteristics and advantages of the invention will emerge from the description which will now be given by way of example and with reference to the accompanying drawings in which.

Figure 1:
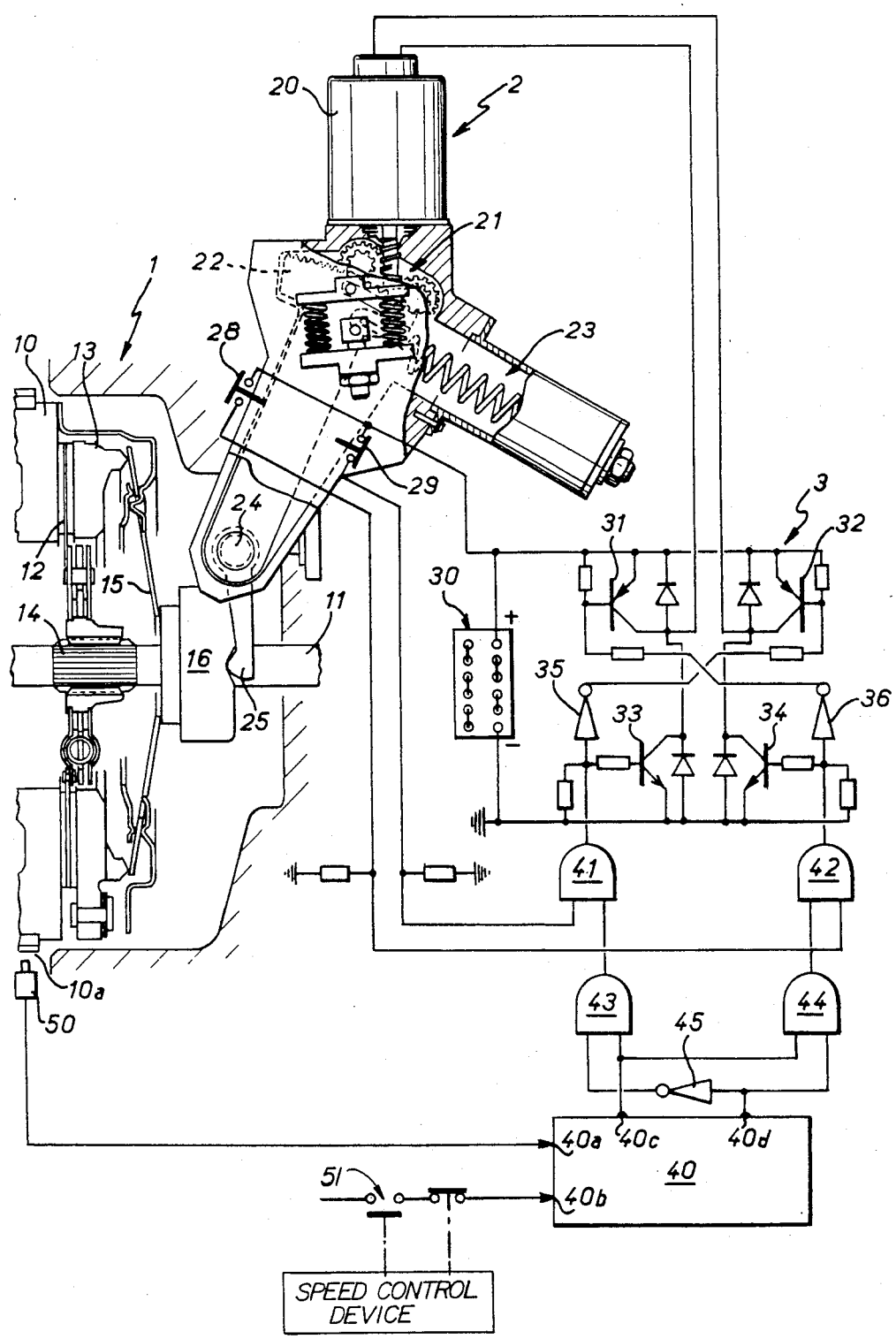
FIG. 1 is a schematic diagram of a control device in accordance with the invention.

In the selected embodiment shown in FIG. 1, a clutch 1 disposed between the flywheel 10 of an automotive vehicle motor and a driven shaft 11 at the gearbox input is equipped with a motor-gearbox unit 2 for operating the clutch 1. The clutch 1 conventionally comprises a friction disk assembly 12 mounted on the shaft 11 by means of splines 14, in order to lock the friction disk assembly 12 to the shaft 11, whilst leaving it free to slide longitudinally. The friction disk assembly 12 is disposed between the plane surface of the flywheel 10 and a pressure plate 13 urged towards the flywheel 10 by a diaphragm spring 15. On the central part of the diaphragm 15 there is mounted a thrust bearing 16 in such a way that displacement of the thrust bearing 16 in the direction towards the flywheel 10 releases the pressure plate 13. The motor-gearbox unit 2 comprises an electric motor 20 with a permanent magnet stator and a rotor equipped with a collector, which drives through the intermediary of a worm and pinion speed reducer 21 a toothed sector 22 rotating on a shaft 24 and driving a fork 25 which can act on the thrust bearing 16 of the clutch 1. Springs 23 partially balance the reaction forces of the diaphragm spring 15, so as to regulate the resisting torque experienced by the motor 20 on operating the clutch. End of travel switches 28 and 29 are associated with the toothed sector 22. The motor-gearbox unit 2 is of the type described in French patent application No. 82 04603.

The motor 20 is supplied with power from the battery 30 of the vehicle via a switching device 3 comprising two PNP transistors 31 and 32 and two NPN transistors 33 and 34. The emitter-collector spaces of transistors 31 and 33 on the one hand and 32 and 34 on the other hand are disposed in series; the emitters of the PNP transistors 31 and 32 are connected to the positive pole of the battery, those of transistors 33 and 34 to the negative pole and the collectors of transistors 31 and 33 on the one hand and 32 and 34 on the other hand are respectively connected to the two terminals of the motor 20. The bases of the transistors 34 and 31 on the one hand and 33 and 32 on the other hand are connected through respective inverters 35 and 36. Thus a "positive" state at the base of transistor 33 results in an "earthed" state at the base of transistor 32 so that under these conditions both transistors 33 and 32 are saturated, whereas an "earthed" state at the base of transistor 33 corresponds to a "positive" state at the base of transistor 32, so that both transistors are turned off. Transistors 34 and 31 function similarly in conjunction with inverter 36. It will have been understood that the simultaneous saturation of transistors 33 and 32 or of transistors 34 and 31 supplies substantially the full battery voltage to the motor, to cause rotation in the respective direction.

The bases of transistors 33 and 34 are connected to the outputs of respective "AND" gates 41 and 42 which have respective first inputs connected to the end of travel switches 29 and 28 so that when these end of travel switches are closed the first input of gates 41 and 42 is at logic 1 and, when switch 28 or 29 opens on the arrival of the sector 22 at one of its extreme positions, clutch fully engaged or fully disengaged, one of the gates 42 or 41 receives on its first input a zero state and the output of this gate is "0" whatever the state of the other input.

The second inputs of gates 41 or 42 are connected to the output of respective "AND" gates 43 and 44. These latter gates have first inputs connected together to an output 40c of a microprocessor 40, whereas their second inputs are connected to an output 40d of the microprocessor, gate 44 directly and gate 43 through an inverter 45. It will be understood that, depending on whether the logic state at the output 40d is "0" or "1", gates 43 and 44 will respectively transmit to the second inputs of gates 41 and 42 the "1" states which are present at the output 40c so that, unless the corresponding end of travel switch 29 or 28 is open, the motor 20 is supplied with power for one direction of rotation.

The microprocessor is programmed so that positive pulses of defined duration appear at its output 40c while output 40d is at a "0" or "1" state. The microprocessor 40 has an input 40a which receives signals from a motor rotation speed sensor, which is symbolically represented here as coupled to the toothed starter ring 10a. Furthermore, the microprocessor has an input 40b connected to a logic system of sensors coupled to vehicle control members, the logic system being adapted so that a "1" state corresponds to a clutch release order and a "0" state corresponds to a conditional clutch engagement order.

The recurrence frequency of the positive pulses at output 40c may be adjusted between a minimum and a maximum value at which the pulses are juxtaposed. The duration of the pulses is defined as a multiple of the period of the microprocessor clock pulses, and the recurrence period is also defined as a multiple of the clock period, this latter multiple being at least equal to the multiple which defines the pulse duration. The rank of the multiple of the recurrence period is thus a number generated by the microprocessor.

When input 40b is at state "1" (clutch release order) output 40d is at state "0" and the recurrence frequency is maximum, which means in practice that output 40c is held at state "1". The output of gate 43 is then at state "1" and, provided that the end of travel switch 29 is closed, the motor 20 of the motor-gearbox unit 2 turns the toothed sector 22 continuously in the direction which commands release of the clutch (clockwise in the figure). When the end of travel switch 29 is opened, the output of gate 41 goes to state "0" and the motor 20 is no longer supplied with power.

When input 40b is at state "0" (clutch engagement order), the recurrence frequency of the positive pulses at output 40c and the state at output 40d are determined according to the motor rotation speed, translated into a stream of pulses at a frequency proportional to the rotation speed by the sensor 50. The recurrence frequency of the pulses at the output 40c is a direct function of the frequency received at input 40a, with a threshold corresponding to the motor idling speed. It will be understood that the relationship between the recurrence frequency at output 40c and the frequency applied to input 40a is not linear and takes into account the characteristics of the motor and of the vehicle, and that the use of a programmed microprocessor makes it a simple matter to implement the correspondence-defining algorithms, either using digital calculation techniques or by looking up a table stored in memory. Also, the frequency of the signals at input 40a is determined periodically, by comparison with the microprocessor clock, and each measurement is compared with the immediately preceding measurement. Furthermore, the microprocessor 40 has derived from the motor rotation speed as indicated by the signal produced by the sensor 50 a threshold acceleration, with sign, using a stored algorithm. When the difference between a measured frequency and that immediately preceding it, which is representative of the acceleration of the motor, is algebraically higher than the threshold acceleration, allowing for the sign of the acceleration, the output 40d is at state "1", whereas if it is algebraically lower than the threshold acceleration, the output 40d is at state "0". With reference to the foregoing explanation with regard to a clutch release order, it will be understood that a "1" state at output 40d corresponds to displacement of the motor-gearbox unit towards the clutch engaged position and a "0" state to a displacement towards the clutch released position. Also, each positive pulse at output 40c determines a rotation increment of the motor 20 and thus a displacement increment of the fork 25 and the thrust bearing 16. On average, the recurrence frequency of the pulses at output 40c determines the speed of displacement of the clutch release/engagement control mechanism.

Operation may be described in the following terms: when the gearbox is set at neutral the logic system 51 ouputs a "1" state; as a consequence of this output 40d is at state "0" and a stream of contiguous pulses is produced at output 40c. The electric motor 20 moves the toothed sector 22 clockwise until the end of travel switch 29 is opened. In parallel with this, the fork 25 has pushed in the centre of the diaphragm spring 15, through the intermediary of the thrust bearing 16, so releasing the friction disk assembly 12 so that it is not clamped between the flywheel 10 and the thrust plate 13. To start the vehicle, beginning with the gearbox set at neutral and the motor idling, a gear is selected. This cancels the "1" state at input 40b of the microprocessor 40. Output 40d goes to state "1". As the motor is idling, the frequency of the signal applied to input 40a is less than the threshold frequency and no pulse appears at output 40c.

If acceleration is now applied, the rotation speed rises above the threshold value and pulses begin to appear at output 40c; as output 40d is still at state "1" and the end of travel switch 28 is closed, the motor-gearbox unit 2 rotates in increments in the direction which corresponds to engagement of the clutch; the recurrence frequency output by the sensor 50 increases and conditions by means of an appropriate algorithm the bringing closer together of the motor rotation increments. When the friction disk assembly 12 begins to be clamped between the flywheel 10 and the pressure plate 13, torque is transmitted to the driven shaft 11 and as a consequence of this the rate of increase in the motor speed is reduced, while the clamping force on the friction disk assembly increases, increasing the torque transmitted. If the torque transmitted should exceed the available driving torque, the motor slows; the frequency received at input 40a of the microprocessor 40 drops; if the deceleration of the motor exceeds the threshold deceleration—or algebraically speaking, if the motor acceleration is below the threshold acceleration—a "0" state appears at output 40d; the direction of rotation of the motor 20 is reversed and the friction disk assembly is unclamped until the motor, relieved of the load, accelerates up to speed again, whereupon the clutch engagement process is resumed.

Gear changes are executed in a similar manner, selection of the neutral position resulting in a clutch release operation, still at maximum speed, whereas selection of a new gear results in a progressive clutch engagement phase on resumption of acceleration.

It will be noted that the electromechanical clutch control members, motor-gearbox unit 2 and switching device 3 constitute an interface between the clutch 1 and the microprocessor 40, specifically adapted for micrological control, and that this interface applies only minimal constraints in respect of the software which defines the algorithm relating the input data representing the vehicle control situation to the output data conditioning clutch engagement/release operations.

Figure 2:
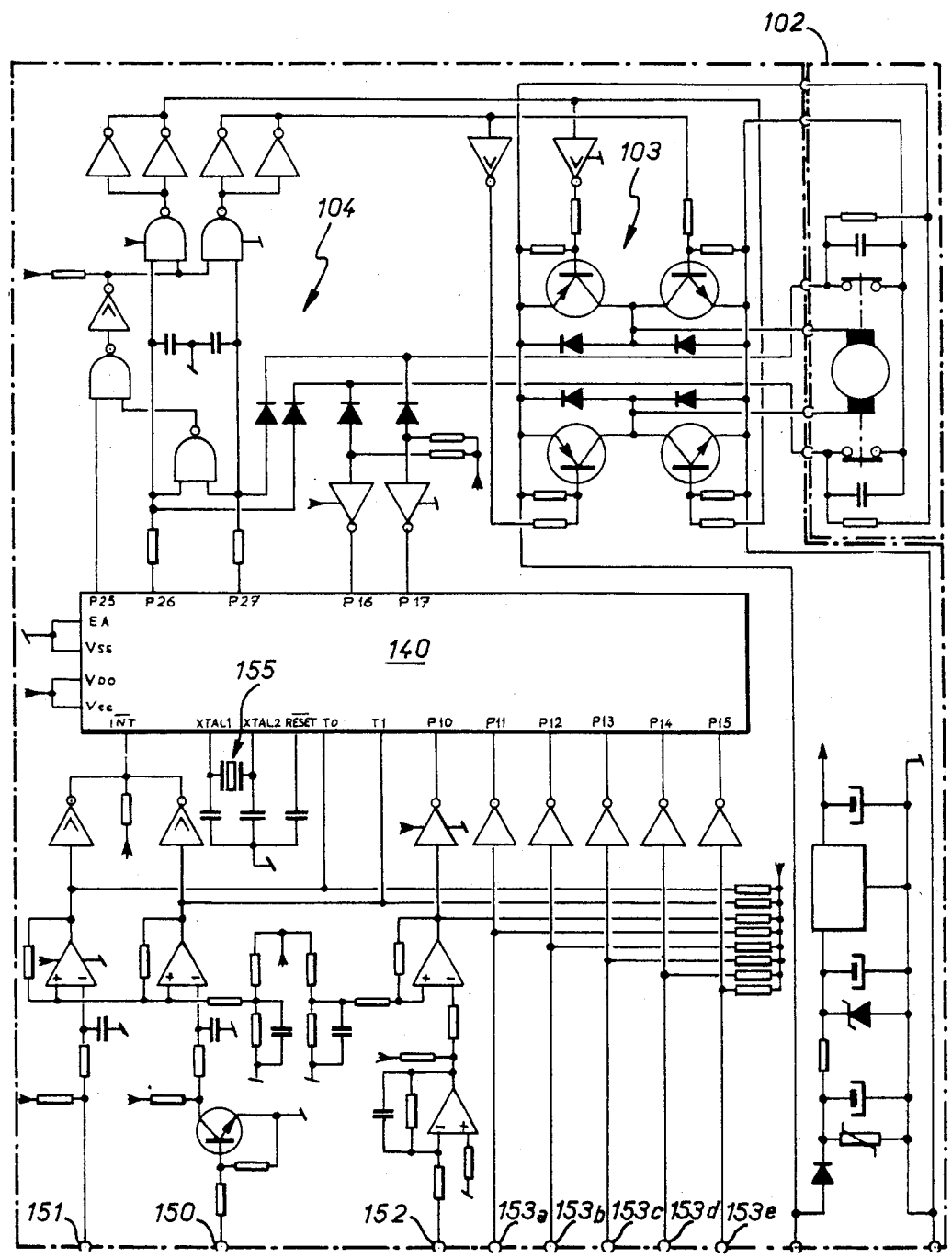
FIG. 2 is a schematic diagram of the electronic part of a control device using speed sensors on the driving and driven members of the clutch.

The clutch control device shown in FIG. 2 comprises a motor-gearbox unit 102 and a switching device 103 which are practically identical to units 2 and 3 in FIG. 1. On the other hand, the logic circuit 104 disposed between the microprocessor 140 and the switching device 103 features a slightly different configuration of the gates 41, 42, 43 and 44 to produce an analogous result. As the channels of the switching device 103 are driven by respective separate outputs of the microprocessor 140, simultaneous activation of these outputs results in disabling of both channels of the switching device 103.

The most significant differences between the control devices shown in FIGS. 1 and 2 arise from the data applied to the microprocessor inputs.

In the device shown in FIG. 2, the logic system which produces the two-state signal, the active state of which corresponds to a clutch release order, terminates at terminal 151 so that the signal, after shaping, is applied to input $T_0$ of the microprocessor 140. The motor speed sensor, equivalent to the sensor 50 in FIG. 1 and connected to terminal 151, is connected to input $T_1$ of the microprocessor. There is, however, a similar sensor coupled to the gearbox output shaft, connected to terminal 152 and therefore linked to input P10 of the microprocessor, whereas inputs P11–P15, connected to terminals 153a, b, c, d and e, receive signals representing respective gearbox ratios (first, second, third, fourth and reverse) actually selected. It is seen that the data applied to inputs P10–P15 of the microprocessor 140 defines a series of conditions under which the motor should be coupled by the clutch, and it will be understood that the algorithm relating the input and output data, recurrence frequency and direction of operation will be adapted to suit these conditions.

This opens the way to numerous improvements in terms of driver comfort and the service life of the clutch, by modification of the software. Thus it is possible to prevent the vehicle being started in an inappropriate gear, likely to be prejudicial to the service life of the clutch. Moreover, simultaneous monitoring of the rotation speeds of the motor and the gearbox input shaft makes it possible to implement clutch engagement processes tailored to specific situations, and in particular engagement processes in which the gearbox input shaft rotates at a higher speed than the motor. This situation arises fairly frequently on changing gear, especially when the braking effect of the motor is desired. An analogous situation arises when it is required to start the motor via the transmission with the vehicle moving, notably to start the motor by pushing or towing the vehicle in the event of a breakdown.

Note that the internal clock of the microprocessor is coupled to a quartz crystal 155 to precisely define the clock period and consequently the duration of the output pulses and their recurrence frequency.

The duration of the pulses is defined so as to correspond to an increment of displacement of the clutch operating means. Thus this defined duration may comprise a variable number of clock periods, for adjusting the increment as required.

The foregoing description has made little reference to the software controlling the operation of the microprocessor. This software lies outside the strict scope of the present invention and is not necessary to the implementation of the invention in a predefined form. The relationship between the input and output data, which data has been described, depends in part on the characteristics of the vehicle and its motor and in part on the expected behaviour of the driver to be simulated. Note that the development of a new type vehicle in practice involves selecting the motor and vehicle characteristics with reference to a typical driver representative of the intended customer, which implies the parallel determination of driver behaviour. Finally, the software corresponds to the digital implementation of a selected behaviour pattern, known in a general way to the man skilled in the art who is in this instance the designer of the vehicle, a behaviour pattern which the designer adapts to the target customer profile. Thus in this aspect also the software is outside the scope of the present invention.

I claim:

1. Automatic control device for a clutch (1) of a motor vehicle, said automatic control device comprising at least one proportional sensor (50) responsive to the rotation speed of an engine of a motor vehicle providing speed proportional sensor signals and a logic system (51) adapted to be coupled to a speed control device of the vehicle and adapted to produce a two-state signal including an active state corresponding to a clutch release order, operating means (2) for operating the clutch between first engaged and second disengaged positions, and control means (3, 40) controlling the operating means (2) responsive to the proportional sensor signals and to the two-state signal so that the clutch (1) is moved into the second disengaged position in response to the active state of the two-state signal and, in the absence of such active state, the clutch is moved toward the first engaged position, said operating means (2) being connected to a direct current voltage source (30) through an on/off switching device with two channels corresponding to movement toward the first engaged and second disengaged positions, respectively, and said control means comprising a logic processor (40) defining means for algebraically deriving an acceleration signal from said speed proportional sensor signal, means for comparing said derived acceleration signal with a predetermined threshold acceleration signal to provide a logic signal depending on whether said derived signal is higher or lower than said predetermined threshold acceleration signal, and means for enabling the first or second channel of said switching device as a function of said logic signal for recurring periods of fixed duration, at a recurrence frequency which is a selected function of the speed proportional sensor signal.

2. Device according to claim 1, further comprising means for conditioning said predetermined threshold acceleration signal as a function of said speed proportional sensor signal.

3. Device according to claim 1, for use with a speed control device comprising a gearbox, wherein said means for enabling the first or second channel of said switching device further comprises means for deriving the frequency of said recurring periods from said speed sensor signal in accordance with one of a plurality of memorized monotonic functions, and means for selecting said one of said plurality of monotonic functions in response to a selected gearbox ratio of a said gearbox.

4. Device according to claim 1, wherein the logic processor enables the second channel of the switching device in response to the active state of the two-state signal, the recurrence frequency then being such that said recurring periods are adjacent in time.

* * * * *